US006195369B1

United States Patent
Kumar et al.

(10) Patent No.: US 6,195,369 B1
(45) Date of Patent: Feb. 27, 2001

(54) HIGH STABILITY SOLITON SOURCE

(75) Inventors: Prem Kumar, Skokie; Donald L. Sipes, Crystal Lake; Douglas W. Anthon, Wheaton; William L. Kath, Evanston, all of IL (US); Darwin K. Serkland, Greenfield, WI (US); Timothy C. Munks, Crystal Lake, IL (US)

(73) Assignee: Scientific-Atlanta, Inc., Norcross, GA (US)

( * ) Notice: Subject to any disclaimer, the term of this patent is extended or adjusted under 35 U.S.C. 154(b) by 0 days.

(21) Appl. No.: 08/959,532

(22) Filed: Oct. 24, 1997

Related U.S. Application Data

(63) Continuation of application No. 08/819,100, filed on Mar. 13, 1997, which is a continuation-in-part of application No. 08/577,424, filed on Dec. 22, 1995, now Pat. No. 5,651,022.
(60) Provisional application No. 60/021,816, filed on Jul. 16, 1996.

(51) Int. Cl.[7] .................................................. H01S 3/17
(52) U.S. Cl. ................... 372/26; 372/25; 372/6; 372/40; 372/30
(58) Field of Search .................. 372/6, 26, 30, 372/40, 25, 19

(56) References Cited

PUBLICATIONS

Siegman, Anthony, *Lasers* pp. 392–396 (1986).
Chernikov, S.V., Taylor, J.R., Mamyshev, P.V., and Dianov, E.M., "Generation of Soliton Pulse Train in Optical Fiber Using Two CW Single–mode Diode Lasers", *Electron. Lett.* 28, 931–932 (1992).
Chernikov, S.V., Richardson, D.J., Laming, R.I., Dianov, E.D., and Payne, D.N., "70 Gibits/Fiber Based Source of Fundamental Solitons at 1550 nm" *Electron. Lett.* 28, 1210–1212 (1992).
Swanson, E.A., Chinn, S.R., Hall, K., Rauschenbach, K.A., Bondurant, R.S., and Miller, J.W., "100–GHz Soliton Pulse Train Generation Using Soliton Compression of Two Phase Side Bands from a Single DFB Laser", *IEEE Photonic Technol. Lett.*, vol. 6, No. 10, 1194–1196 (1994).
Swanson, E.A., and Chinn, S.R., "40–GHz Pulse Train Generation Using Soliton Compression of a Mach–Zehnder Modulation Output", *IEEE Photonic Technol. Lett.*, vol. 7, No. 1, 114–116 (1995).
Chernikov, S.V., Taylor, J.R., and Kashyep R., "Integrated All Optical Fiber Source of Multigigahertz Soliton Pulse Train", *Electron. Lett.* 29, 1788–1789 (1993).
Anthon, D.W., Pier, T.J., "Diode–pumped Erbium Glass Lasers", *SPIE*, vol. 1627 Solid State Laser III (1992).
E.A. Swanson and S.R. Chinn, "23–GHz and 123–GHz Soliton Pulse Generation using Two CW Lasers and Standard Single–Mode Fiber", *IEEE Photonic Technol. Lett.*, vol. 6, No. 7, 796–798 (1994).

*Primary Examiner*—Leon Scott, Jr.
(74) *Attorney, Agent, or Firm*—Kenneth M. Massaroni; Kelly A. Gardner; Hubert J. Barnhardt, III

(57) ABSTRACT

A highly stable soliton source uses a bulk Er/Yb glass laser which operates in two longitudinal modes of the laser cavity with substantially identical amplitudes to generate beat modulation. The beat modulation is then passed through a pulse compression fiber which compresses the beat modulation into a train of soliton pulses. Because the beat modulation is between two modes of the same laser cavity, the soliton pulse train generated is highly stable with low timing jitter.

27 Claims, 4 Drawing Sheets

HIGH STABILITY SOLITON SOURCE

BACKGROUND OF THE INVENTION

This application is a continuation of Ser. No. 08/819,100 filed Mar. 13, 1997 now abandoned, which is a continuation-in-part of Ser. No. 08/577,424 now U.S. Pat. No. 5,651,022 filed on Dec. 22, 1995 and Ser. No. 60/021,816 filed respectively on Dec. 22, 1995 and Jul. 16, 1996, for which priority is claimed. These applications are incorporated herewith by reference.

This invention was made with Government support under Grant Number(s)F30602-94-1-0003 and F49620-93-1-0084 awarded by the Department of the Air Force. The Government may have certain rights in the invention.

FIELD OF THE INVENTION

This invention relates generally to optical information and communication systems, and more particularly to a high-repetition-rate soliton source for use in optical information and communication systems to transmit data over optical fibers.

STATEMENT OF RELATED ART

Sources of short optical pulses of high-repetition-rate (10–100 GHz) are important for time-division-multiplexed (TDM) optical communication systems, optical switching, optoelectronics, and optical computing. Among the different high-repetition-rate optical pulse sources, soliton sources are of particular interest. In optical communication, the top data transmission speed is limited by pulse broadening. Because an optical soliton does not change its waveform as it propagates along an optical fiber, short soliton pulses can be transmitted at a high rate over long distances, thereby enabling high-speed communication over optical fiber networks. A general discussion of the propagation of solitons in optical fibers can be found, for example, in *Lasers* pp. 392–396 (1986) by Anthony E. Siegman.

One attractive method of generating a high-repetition-rate soliton pulse train is to compress the beat modulation of two optical carrier waves into solitons. Several soliton sources employing such a method have been proposed. Some of those soliton sources use the output of two distribution feedback (DFB) lasers to obtain the beat modulation. Soliton sources of this type were described, for example, by S. V. Chernikov, J. R. Taylor, P. V. Mamyshev, and E. M. Dianov in "Generation of Soliton Pulse Train in Optical Fiber Using Two CW Single-mode Diode Lasers," Electron. Lett. 28, 931–932 (1992); S. V. Chernikov, D. J. Richardson, R. I. Laming, E. D. Dianov, and D. N. Payne in "70 Gbits/s Fiber Based Source of Fundamental Solitons at 1550 nm," Electron. Lett. 28, 1210–1212 (1992); and E. A. Swanson and S. R. Chinn, in "23-GHz and 123-GHz Soliton Pulse Generation Using Two CW Lasers and Standard Single-Mode Fiber," IEEE Photonic Technol. Lett., vol. 6, no. 7, 796–798 (1994). This approach allows for tunability of the soliton pulse repetition rate by adjusting the frequency difference between the output waves of the two lasers. The period of the resultant pulsetrain is rather unstable, however, due to the large free-running laser line-width of the DFB lasers.

In another approach, the output of a single DFB laser, which can be an external cavity laser with a narrow line width, is modulated externally using a stable frequency source. Soliton sources of this type were described, for example, by E. A. Swanson, S. R. Chinn, K. Hall, K. A. Rauschenbach, R. S. Bondurant, and J. W. Miller in "100-GHz Soliton Pulse Train Generation Using Soliton Compression of Two Phase Side Bands from a Single DFB Laser," IEEE Photonic Technol. Lett., vol. 6, no. 10, 1194–1196 (1994); and E. A. Swanson and S. R. Chinn in "40-GHz Pulse Train Generation Using Soliton Compression of a Mach-Zehnder Modulation Output," IEEE Photonic Technol. Lett., vol. 7, no. 1, 114–116 (1995). This technique yields a quite stable repetition period, but at the expense of system complexity. The cost of such a soliton source is high due to the need for a stable external frequency driver.

Another proposed approach uses a dual-frequency coupled-cavity erbium-doped fiber laser which has two coupled but separate laser cavities formed with intracore fiber-grating reflectors. Such a soliton source was described, for example, by S. V. Chernikov, J. R. Taylor and R. Kashyep in "Integrated All Optical Fiber Source of Multi-gigahertz Soliton Pulse Train," Electron. Lett. 29, 1788–1789 (1993). Although a soliton source of this type can potentially be of low cost, the stability of the generated soliton pulse train is sacrificed because of the use of two separate cavities and the relatively long coupled-cavity length that is required to obtain two-frequency operation. For example, the 59.1-GHz soliton source described by Chernikov et al. is stated to have frequency instability in the multi-MHZ range.

In view of the foregoing, it is a primary object of the present invention to provide a high-repetition-rate soliton source that is highly stable and relatively inexpensive.

It is a more specific object of the present invention to provide a high-repetition-rate soliton source based on the principle of compressing beat modulation into soliton pulses that has a simple structure, is highly stable, and can be made at a relatively low cost.

SUMMARY OF THE INVENTION

In accordance with these and other objects of the present invention, a general aspect of the present invention includes a high-stability soliton source which uses a laser having a single cavity and that is operated in two longitudinal modes with substantially identical amplitudes to form beat modulation. The laser output is passed through a soliton pulse compression fiber which compresses the beat modulation in the laser output into a soliton pulse train.

It is an advantageous feature of the present invention that the beat modulation is generated between two modes of a single laser cavity. Because the two modes belong to the same laser cavity, the frequency of the beat modulation between the two modes is highly stable (i.e., it has very low timing jitter). The stability is achieved without the use of any active stabilization of the laser frequency or the laser temperature.

A further advantage of the soliton source of the present invention is that only one laser is required to generate the beat modulation, and there is no need for an expensive external frequency driver. The soliton source thus has a very simple structure and can be made at a relatively low cost.

These as well as other novel advantages, details, embodiments, features and objects of the present invention will be apparent to those skilled in the art from following the detailed description of the invention, the attached claims and accompanying drawings, listed hereinbelow, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrative embodiments, in which.

DETAILED DESCRIPTION OF THE INVENTION

For a better understanding of the present invention, reference may be had to the following detailed description taken in conjunction with the appended claims and accompanying drawings.

Figure 1A:
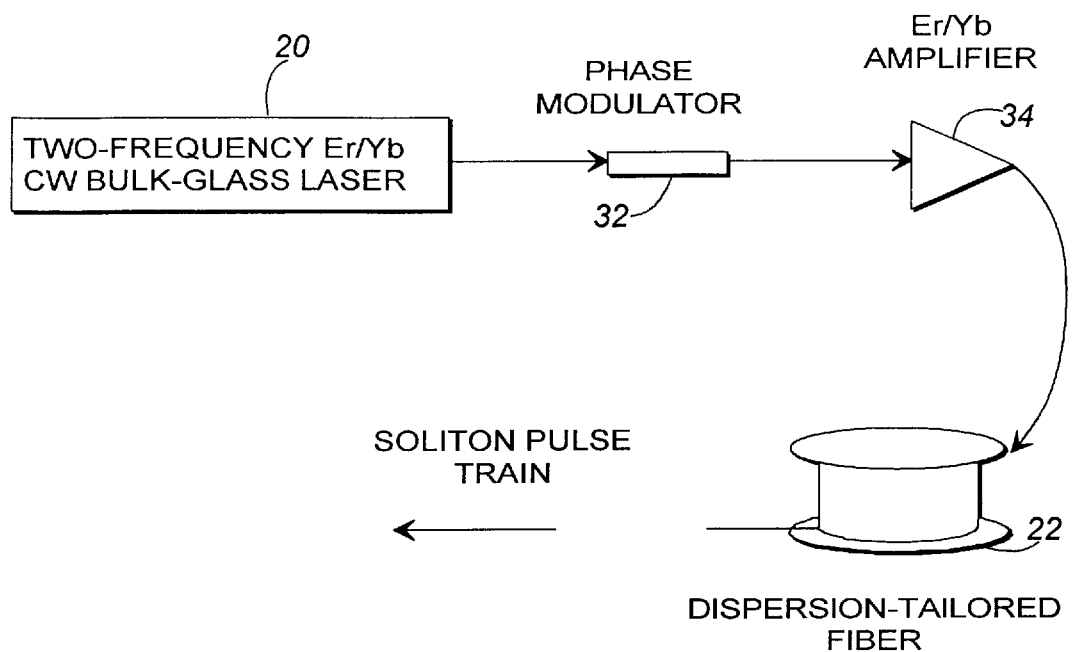
FIG. 1A shows, in a schematic form, an embodiment of the soliton source according to the preferred embodiment of the present invention.

Turning now to the drawings, FIG. 1A shows an embodiment of the soliton source of the present invention. Generally, the soliton source comprises a laser 20 and a soliton pulse compression fiber 22. In accordance with the present invention, the laser 20 has a single laser cavity and is capable of stable operation simultaneously in two separate laser modes such that the amplitudes of the two laser modes are substantially identical. The output of the laser 20, which is in the form of sinusoidal beat modulation between the two modes, is then passed through the soliton pulse compression fiber 22 which compresses the beat modulation into a train of soliton pulses.

It is a feature of the present invention that a highly stable soliton pulse train with very low timing jitter is obtained by using laser waves in two longitudinal modes of the same laser cavity to form beat modulation. Since the laser modes belong to the same cavity, external perturbations tend to affect the phases and frequencies of both laser modes. By virtue of common mode rejection, the frequency of the beat modulation, which is the difference between the frequencies of the two laser modes, is highly stable.

Figure 1B:
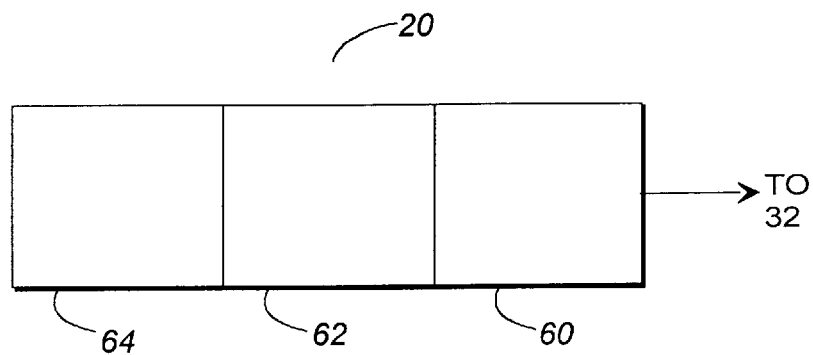
FIG. 1B shows a block diagram of a bulk glass laser according to the preferred embodiment of the present invention.

In the present embodiment, as shown in FIG. 1B, the laser 20 is a shortcavity bulk glass laser using Erbium/Ytterbium (Er/Yb) co-doped phosphate glass 60 as the gain medium, which is pumped by a Nd:YAG laser 62 which in turn is pumped by a semiconductor-diode laser 64. Such a laser is available as the Apex® 1.5 μm Single Frequency Microlaser, Model No. 1.5-U, manufactured by ATx Telecom Systems, Inc. in Naperville, Ill., and was generally described by D. W. Anthon and T. J. Pier in "Diode-pumped Erbium Glass Lasers," SPIE Vol. 1627 *Solid State Laser III* (1992), which is hereby incorporated by reference. The laser architecture of this laser is disclosed in U.S. application Ser. No. 08/577,424 of Douglas W. Anthon and Timothy C. Munks, entitled "Multi-element Monolithic Solid State Laser," which is hereby incorporated by reference. Those skilled in the art will appreciate, however, that the laser structures according to the teaching of the present invention are not limited to erbium lasers, but can be advantageously used to construct lasers using other types of gain materials including, but not limited to, Nd:YLF, Nd:YAG, and Nd:YVO$_4$. Although the Apex® 1.5-U model is designed mainly for single frequency operation, it can be made to lase simultaneously in two longitudinal modes that are five free spectral ranges apart with substantially identical amplitudes. These techniques are disclosed in U.S. application Ser. No. 08/577,421 of Douglas W. Anthon entitled "Solid State Laser Optimized for Multimode Operation," which is hereby incorporated by reference. The Apex® 1.5-U model is provided with a user-adjustable control means, such as a knob on the front panel, for controlling the pump current for the semiconductor-diode pump laser. With the present setup, the temperature of the laser cavity is controlled by adjusting the pump current into the diode pump laser, and stable dual-mode operation for a typical period of under an hour is achieved. Alternatively, any single cavity laser may be used that is simultaneously operable in two longitudinal modes having a predetermined wavelength separation between the two longitudinal modes and is operable in the third-telecommunications window which generally falls around the 1500–1600 nanometer range. This type of laser would have an advantageous application in optical communications systems utilizing erbium-doped fiber optic amplifiers which generally operate around the 1550 nanometer range.

The advantage of using a bulk-glass laser is that the laser cavity is very short. The shortness of the cavity enhances the common mode rejection effect to generate a highly stable soliton pulse train. Another advantage of using a bulk laser is that the laser can be operated to generate sufficient output power so that only a small amount of amplification, or no amplification at all, is required for soliton generation in the downstream pulse compression fiber.

Figure 2A:
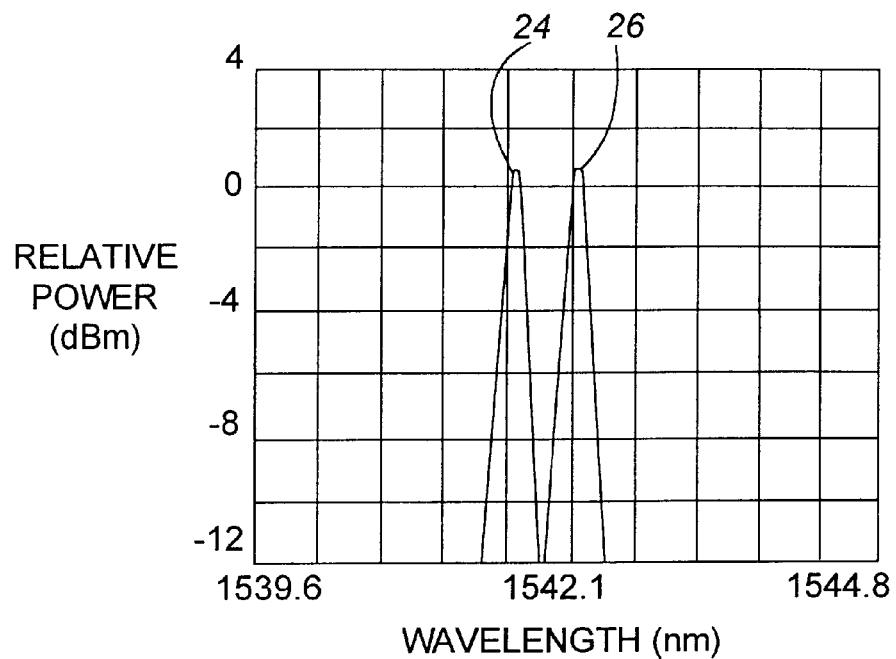
FIG. 2A is an exemplary wavelength spectrum of the output of the laser used in the soliton source of FIG. 1A, showing two components in the laser output corresponding to two laser modes.
Figure 2B:
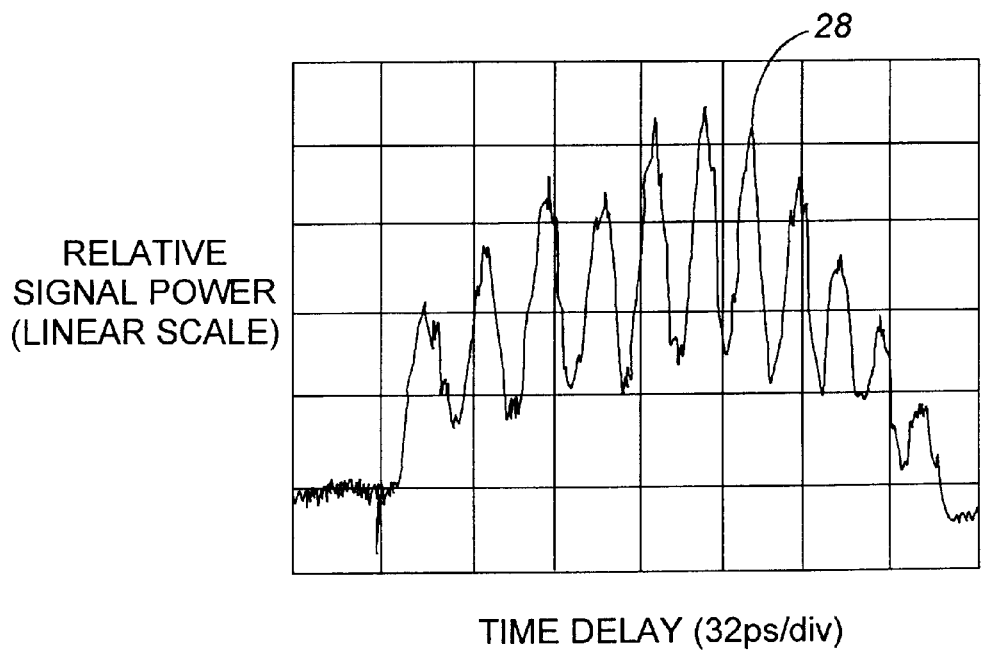
FIG. 2B is an exemplary autocorrelation trace of the output of the laser.

In the present embodiment, the wavelengths of the two lasing modes are centered nominally around 1542 nm and are separated by about 0.5 nm. The laser output is fiber-pigtailed (i.e., coupled to a piece of optical fiber), and typically 90 mW of power is emitted from the fiber output. FIG. 2A is a typical optical spectrum of the laser output. As illustrated, the laser output comprises two components, as indicated by the two peaks 24, 26 in FIG. 2A, which are separated by about 0.5 nm and have substantially identical intensities. FIG. 2B shows an autocorrelation trace 28 measured by sending the laser output into an autoccorrelator. The periodicity and contrast of the autocorrelation signal 23 demonstrates that the laser output has two separate frequency components of similar amplitudes.

Figure 3:
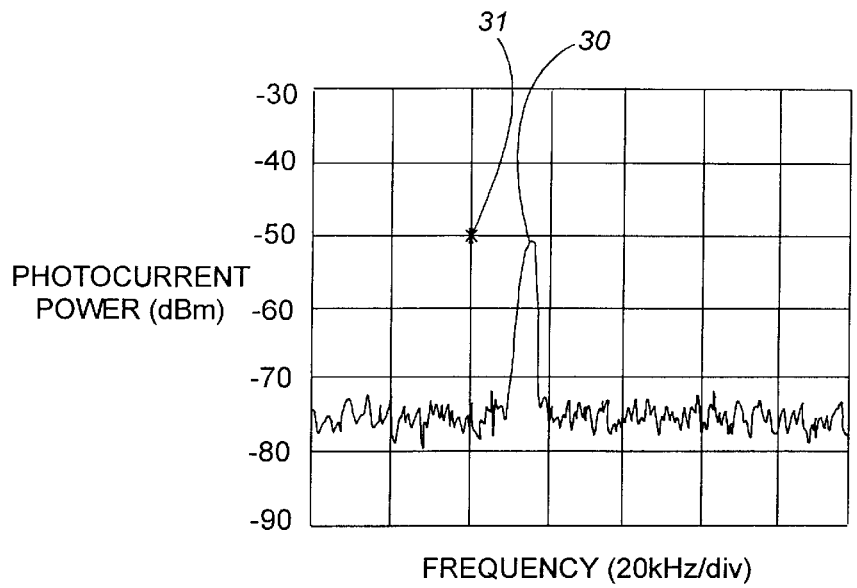
FIG. 3 is an exemplary frequency spectrum of the photocurrent generated by the laser output in a high-speed photodetector in a spectral region around the beat frequency of the two laser modes in the laser output.

Due to the beating between the two components in the laser output, the output intensity of the laser 20 exhibits a sinusoidal variation with a frequency equal to the difference between the frequencies of the two lasing modes. FIG. 3 shows a photocurrent spectrum of the laser output in the vicinity of the beat frequency detected with a fast photodetector. The marker 31 in FIG. 3 corresponds to a frequency of 58.556689 GHz. As illustrated, the laser output has a beat frequency centered around 58.55 GHz. The measured frequency distribution peak 30 of the beat modulation is 4 at Full Width at Half Maximum (FWHM). The peak 30 moves over a range of 100 kHz on the time scale of minutes as the laser temperature drifts. Because the width of the peak 30 in FIG. 3 is limited by the resolution bandwidth of the spectrum analyzer, the short-term stability of the beat frequency is at least as good as 4 kHz. This stability is about $10^{-7}$ of the beat frequency and is two to three orders of magnitude better than that obtainable in the prior art without the use of an expensive external modulation frequency driver. Such significant improvement in stability is obtained without the use of active stabilization of the laser frequency or the temperature of the laser cavity. All that is required is to allow the laser to warm up to an equilibrium temperature.

In the present embodiment, the output of the dual-frequency laser 20 is passed into a phase modulator 32 before it is launched into the soliton pulse compression fiber 22. The phase modulator 32 is preferably driven at about 100 MHZ. Its function is to spectrally broaden the two frequency components in the laser output so that the light launched into the pulse compression fiber 22 would not be reflected back due to stimulated Brillouin scattering (SBS) in the fiber. Because the phase modulator 32 tends to introduce power loss, an Er/Yb codoped fiber amplifier 34 is used after the phase modulator to boost the power of the beat modulation before it enters the pulse compression fiber 22. In the present embodiment, the power that enters the pulse compression fiber 22 is set at 120 mW.

It will be appreciated that the phase modulator 32 and the Er/Yb fiber amplifier 34 are not directly involved in the formation of soliton pulses. Rather, they are used to avoid a nonlinear effect in optical fibers, namely the SBS. If the pulse compression fiber 22 is designed to have negligible SBS therein, such as by tailoring the germanium concentration in the various segments of the fiber, the phase modulator and the fiber amplifier may be eliminated. In such a case, the soliton source will have an extremely simple structure, requiring only a dual-frequency single-cavity laser pumping directly into a pulse compression fiber.

The pulse compression fiber 22 used in the present embodiment is a comb-like dispersion-tailored fiber (DTF). Pulse compression fibers of similar designs for compressing beat modulation into soliton pulse trains were described, for example, by S. V. Chernikov, J. R. Taylor and R. Kashyep in "Integrated All Optical Fiber Source of Multigigahertz Soliton Pulse Train," Electron. Lett. 29, 1788–1789 (1993); and E. A Swanson and S. R. Chinn in "40-GHz Pulse Train Generation Using Soliton Compression of a Mach-Zehnder Modulation Output," IEEE Photonic Technol. Lett., vol. 7, no. 1, 114–116 (1995). In the present embodiment, the pulse compression fiber 22 consists of three pairs of fiber segments. Each pair has one segment of dispersion-shifted fiber (DSF) followed by a segment of standard single-mode telecommunication fiber (STF). The DSF segments are of Corning SMF/DS fiber which has a nonlinear coefficient of about 2.5 $cm^2/W$ and a group velocity dispersion coefficient of about 1 $ps^2/km$. The STF segments are of Corning SMF-28 CPCS fiber which has a nonlinear coefficient of about 1.5 $cm^2/W$ and a group velocity dispersion coefficient of about –20 $ps^2/km$. The values of the nonlinear coefficients and the dispersion coefficients were estimated by comparing the distance dependence of the optical spectrum and the pulse autocorrelation with numerical simulation of the pulse propagation.

Figure 4:
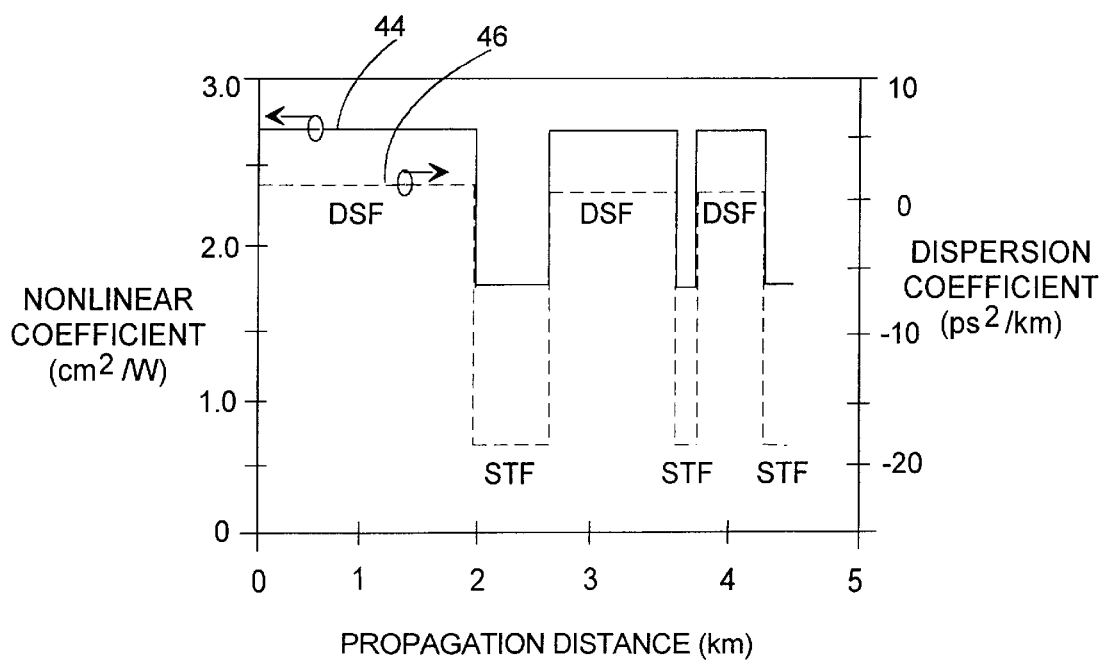
FIG. 4 shows the distance dependence of the dispersion and nonlinear coefficient of the soliton pulse compression fiber used in the soliton source of FIG. 1A.

The design of the pulse compression fiber is illustrated in FIG. 4, which shows the length dependence of the dispersion coefficient and the nonlinear coefficient of the pulse compression fiber 22 as a function of its length. The upper trace 44 in solid lines indicates the nonlinear coefficient of the fiber 22, and the lower trace in dashed lines indicates its dispersion coefficient. As illustrated, the three DSF segments are about 2 km, 1.2 km, and 0.4 km long, respectively. The three STF segments are about 0.6 km, 0.1 km, and 0.1 km long, respectively. When optical pulses propagate through the DSF segments, the predominant effect is selfphase modulation which leads to frequency modulation of the pulses. The frequency modulated pulses are then compressed in the STP segments by virtue of the negative group velocity dispersion coefficient of the STP fiber. By properly selecting the lengths of the alternating DSF and STF segments, the beat modulation with sinusoidal intensity variation is compressed into a train of soliton pulses.

Figure 5A:
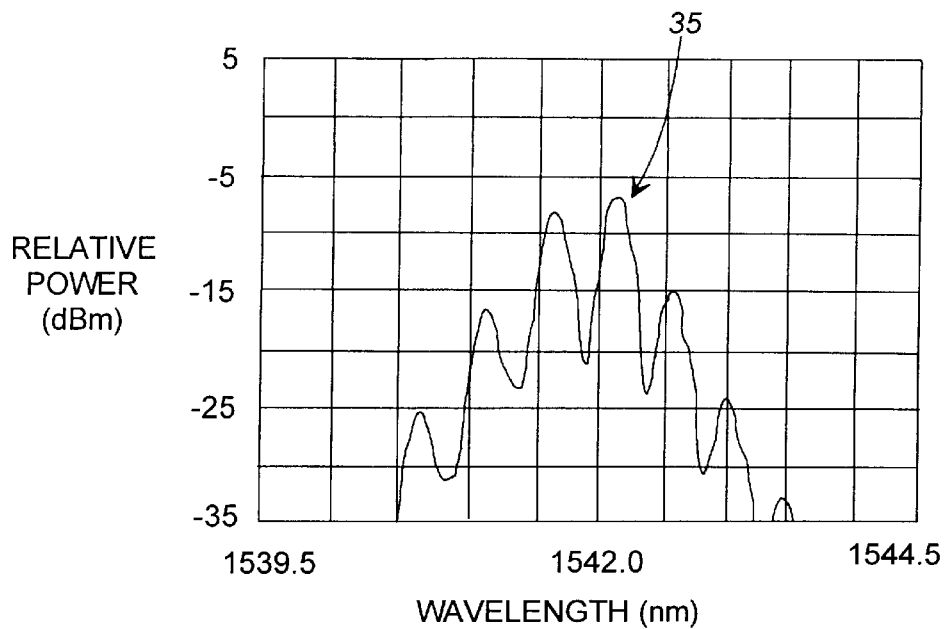
FIG. 5A is an exemplary wavelength spectrum of the output of the soliton source of FIG. 1A.
Figure 5B:
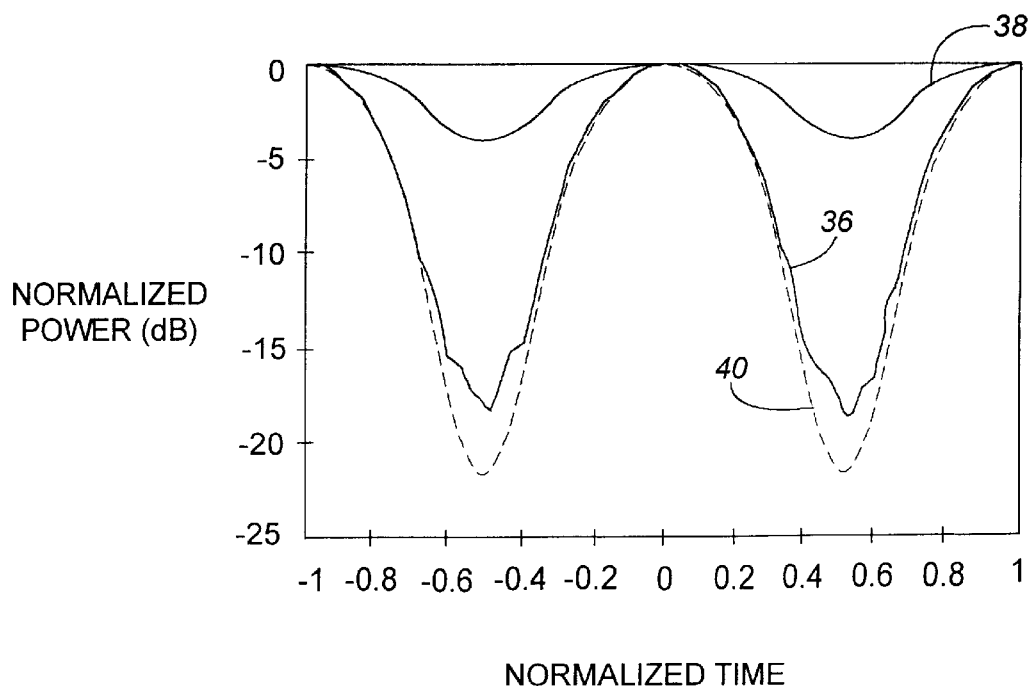
FIG. 5B is an exemplary autocorrelation trace of the output of the soliton source of FIG. 1A.

A typical optical spectrum of the soliton pulse train at the output of the pulse compression fiber 22 is shown in FIG. 5A. As compared to the laser output shown in FIG. 2A, the optical spectrum 35 of the soliton pulse train is considerably broadened, as new peaks have appeared due to self-phase modulation in the pulse compression fiber 22. The measured autocorrelation trace 36 of the soliton pulse train is shown in FIG. 5B. The calculated autocorrelation trace 38 for a sinusoidal wave of identical period is also shown for reference. As illustrated, the FWHM width of the measured autocorrelation trace 36 for the output of the pulse compression fiber is 5.6 ps, which corresponds to a pulse width of 3.2 ps, assuming a $sech^2$ pulse intensity profile. Because the repetition period is 17.1 ps at the beat frequency of 58.55 GHz, a space-to-mark ratio (the ratio of the period of the pulse train to the FWHM pulse width) greater than 5 is obtained. A greater space-to-mark ratio may be obtained if the power launched into the pulse compression fiber 22 is increased, or if the lengths of the fiber segments are further optimized.

FIG. 5B also shows a theoretically predicated autocorrelation trace 40 which is obtained by simulating the pulse propagation in the pulse compression fiber 22 by numerically solving the nonlinear Schrödinger equation which governs the pulse propagation. The agreement between the measured autocorrelation trace 36 and the theoretically predicated autocorrelation trace 40 demonstrates that the beat modulation entering the pulse compression fiber 22 is shaped into a soliton pulse train.

It will be appreciated that the design of the pulse compression fiber 22 described above is only provided as an example and is not intended to limit the scope of the present invention. Comb-like dispersion tailored fibers of different constructions or other types of pulse compression fibers which are tailored for the amplitude and frequency of the laser output can be used for compressing the beat modulation into soliton pulses without deviating from the scope and spirit of the invention. For instance, the space-to-mark ratio can be further increased by using a larger number of pairs of DSF and STF segments in the comb-like dispersion tailored fiber.

In the foregoing specification, the present invention has been described with reference to specific exemplary embodiments thereof Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

What is claimed is:

1. A high-stability soliton source comprising:
   a single cavity laser operable in two longitudinal modes about a desired laser wavelength, said two longitudinal modes having a predetermined difference in wavelength, said single cavity laser producing a beat modulation signal based on said two longitudinal modes; and a soliton pulse compression fiber operatively coupled to said single cavity laser for receiving said beat modulation signal to generate a train of soliton pulses by compression of said beat modulation signal.

2. The system of claim 1, wherein said two longitudinal modes are substantially similar in amplitude.

3. The system of claim 1, wherein said desired laser wavelength is in the third telecommunications window.

4. The system of claim 1, wherein said predetermined difference in wavelength between said two longitudinal modes is at least one free spectral range.

5. The system of claim 1, wherein said predetermined difference in wavelength between said two longitudinal modes is 0.5 nanometers.

6. The system of claim 1, wherein said single cavity laser is operable in an optical communication system having an erbium-doped fiber optic amplifier.

7. The system of claim 1, wherein said single cavity laser is a bulk glass laser.

8. The system of claim 7, wherein said bulk glass laser includes:

a Erbium/Ytterbium co-doped phosphate glass;

a Nd laser coupled to said phosphate glass; and a semiconductor-diode laser coupled to said Nd laser.

9. The system of claim 8, wherein said Nd laser is selected from the group consisting of: a Nd:YLF laser, a Nd:YAG laser, and a Nd:YVO$_4$ laser.

10. The system of claim 1, wherein said pulse compression fiber is a comb-like dispersion-tailored fiber.

11. The system of claim 10, wherein said comb-like dispersion-tailored fiber has at least one pair of fiber segments, each of said fiber segments having a dispersion-shifted fiber segment and a single-mode telecommunication fiber segment.

12. A system of claim 1 further comprising:

a phase modulator operatively coupled to said single cavity laser to receive and broaden said beat modulation signal; and an amplifier operatively coupled to said phase modulator to receive and amplify said beat modulation signal.

13. A method of generating a highly-stable soliton pulse train, said method including the steps of:

modulating a signal to generate a beat modulation signal, said signal being generated from a single cavity laser and having two longitudinal modes about a desired laser wavelength that are a predetermined difference in wavelength; and compressing said beat modulation signal with a soliton pulse compression fiber to generate said highly-stable soliton pulse train.

14. The method of claim 13, further comprising the step of phase modulating said beat modulation signal to broaden its frequency components.

15. The method of claim 14, further comprising the step of amplifying said beat modulation signal.

16. The method of claim 13, wherein said two longitudinal modes are substantially similar in amplitude.

17. The method of claim 13, wherein said predetermined difference in wavelength is at least one free spectral range.

18. The method of claim 13, wherein said predetermined difference in wavelength is 0.5 nanometers.

19. The method of claim 13, wherein said desired laser wavelength is in the third telecommunications window.

20. The method of claim 13, wherein said single cavity laser is operable in an optical communication system having an erbium-doped fiber optic amplifier.

21. The method of claim 13, wherein said single cavity laser is a bulk glass laser.

22. The method of claim 21, wherein said bulk glass laser includes:

a Erbium/Ytterbium co-doped phosphate glass;

a Nd laser coupled to said phosphate glass; and a semiconductor-diode laser coupled to said Nd laser.

23. The system of claim 22, wherein said Nd laser is selected from the group consisting of: a Nd:YLF laser, a Nd:YAG laser, and a Nd:YVO$_4$ laser.

24. The method of claim 13, wherein said soliton pulse compression fiber is a comb-like dispersion-tailored fiber.

25. The method of claim 24, wherein said comb-like dispersion-tailored fiber has at least one pair of fiber segments, each of said fiber segments having a dispersion-shifted fiber segment and a single-mode telecommunication fiber segment.

26. A high-stability soliton source comprising:

a bulk glass laser having a single laser cavity being operable in two longitudinal modes about a desired wavelength to produce a beat modulation signal, said two longitudinal modes being substantially similar in amplitude and having a predetermined difference in wavelength, said bulk glass laser further comprising:

a Erbium/Ytterbium co-doped phosphate glass;

a Nd laser coupled to said phosphate glass, said Nd laser being selected from the group consisting of: a Nd:YLF laser, a Nd:YAG laser, and a Nd:YVO$_4$ laser; and a semiconductor-diode laser coupled to said Nd laser; and a comb-like dispersion-tailored fiber coupled to receive said beat modulation signal to compress said beat modulation signal and produce a train of soliton pulses, said comb-like dispersion-tailored fiber having at least one pair of fiber segments, each of said fiber segments having a dispersion-shifted fiber segment and a single-mode telecommunication fiber segment.

27. The system of claim 26, further comprising:

a phase modulator coupled to said bulk glass laser to receive and broaden said beat modulation signal;

an amplifier coupled to said phase modulator to receive and amplify said beat modulation signal.

* * * * *

UNITED STATES PATENT AND TRADEMARK OFFICE
CERTIFICATE OF CORRECTION

PATENT NO. : 6,195,369 B1
DATED : February 27, 2001
INVENTOR(S) : Kumar et al.

It is certified that error appears in the above-identified patent and that said Letters Patent is hereby corrected as shown below:

<u>Title page,</u>
Assignee, please insert -- and Northwestern University, Evanston, IL (US) --

<u>Column 1,</u>
Line 60, delete "pulsetrain" and insert therefore -- pulse-train --

<u>Column 4,</u>
Line 64, delete "is 4 at" and insert therefore -- is 4 kHz at --

<u>Column 6,</u>
Line 4, delete "selfphase" and insert therefore -- self-phase --
Line 54, insert a period between "thereof" and "Although"

Signed and Sealed this

Fifth Day of February, 2002

Attest:

JAMES E. ROGAN
*Attesting Officer*  *Director of the United States Patent and Trademark Office*